US006892056B1

(12) United States Patent
Garmonov et al.

(10) Patent No.: US 6,892,056 B1
(45) Date of Patent: May 10, 2005

(54) SUBSCRIBER STATION WITH DUPLEX ANTENNA AMPLIFIER

(75) Inventors: Alexandr Vasilievich Garmonov, Voronezh (RU); Sergei Nikolaevich Dodik, Voronezh (RU); Anatoly Maximovich Zherebjatiev, Voronezh (RU); Yaroslav Vladimirovich Grishchuk, Voronezh (RU)

(73) Assignee: Alexandr Vasilievich Garmanov, Voronezh ( * ) Notice: Subject to any disclaimer, the term of this patent is extended or adjusted under 35 U.S.C. 154(b) by 504 days.

(21) Appl. No.: 10/031,962
(22) PCT Filed: Jun. 22, 2000
(86) PCT No.: PCT/RU00/00245
§ 371 (c)(1), (2), (4) Date: Jan. 22, 2002
(87) PCT Pub. No.: WO01/10148
PCT Pub. Date: Feb. 8, 2001

(30) Foreign Application Priority Data

Jul. 29, 1999 (RU) ............................................. 99116567

(51) Int. Cl.[7] ............................ H04B 1/40; H04B 1/46; H04B 1/38; H04M 1/00
(52) U.S. Cl. ............................ 455/75; 455/80; 455/81; 455/82; 455/83; 455/550.1; 455/574
(58) Field of Search .............................. 455/75, 78, 80, 455/81–83, 73, 550.1, 574

(56) References Cited

U.S. PATENT DOCUMENTS

| 4,704,733 A | 11/1987 | Kawano |
| 4,850,034 A | 7/1989 | Campbell |
| 5,502,715 A | 3/1996 | Penny |
| 5,737,687 A | 4/1998 | Martin et al. |
| 5,790,961 A | * 8/1998 | Ingram et al. ............... 455/574 |

FOREIGN PATENT DOCUMENTS

SU          291310          4/1971

OTHER PUBLICATIONS

International Search Report PCT/RU00/00245 Aug. 29, 2000.

* cited by examiner

Primary Examiner—Vivian Chin
Assistant Examiner—Yuwen Pan
(74) Attorney, Agent, or Firm—Abelman, Frayne & Schwab

(57) ABSTRACT

For the purpose of making the system more economic, given full compensation of transmitter and receiver signal attenuation in the communication cable, the circuit controlling transmitter enable/disable status, including a controllable power source (control command converter) and a low pass filter separating a receive/transmit UHF signal from a lower frequency up to direct voltage) signal, a number of control commands, is introduced into mobile station, mobile station having autonomous power supply.

According to the first variant of the device, the control command, having passed the low pass filter (19), enables the power source (21) control from which power is supplied to the power amplifier (11) whose amplification is selected so as to compensate attenuation of the transmitter signal traveling from mobile station (1) to antenna (16). The voltage supplied from the mobile station (1) via the communication cable is applied to a stabilizer (22) via the other low pass filter (20) isolating the supply circuit from radio frequency receive and transmit signals.

According to the second variant of the device, a splitter (23) and rejector (24) are used in the duplex antenna amplifier (7). This makes implementation of antenna amplifier simpler and cheaper.

2 Claims, 5 Drawing Sheets

Fig.1

PRIOR ART

SUBSCRIBER STATION WITH DUPLEX ANTENNA AMPLIFIER

FIELD OF TECHNOLOGY

The present invention relates to radio engineering, particularly, to the devices for amplification of signals transmitted via radio communication lines in both directions at a common frequency band and can be applied to radio communications systems, for example, cellular communications systems.

DESCRIPTION OF THE RELATED ART

In higher frequency ranges radio equipment designers encounter the problem of losses in the radio communications line connecting antenna and transceiving equipment. Coaxial communication cables that provide low losses at high frequencies are very expensive. Even these, if of considerable length, cause 20 dB and higher losses. Consequently, the resulting performance is not infrequently degraded. In practice, antenna amplifiers are used to control the power supplied to antenna and compensate the attenuation of radio signals in communication cables.

An antenna circuit for multi-band antenna is described in U.S. Pat. No. 5,258,728 "Antenna circuit for a multi-band antenna", H03H 7/446, H03H 7/38, Nov. 2, 1993. The antenna circuit comprises manifold filter connected between an antenna and a communication unit. The antenna circuit uses various frequency bands and mitigates interferences that occur between the signals supplied to and from the communication unit. The antenna circuit linked to the antenna or manifold filter and the communication unit transforms full resistance relative to a signal with lower frequency band and reduces the losses from full resistance of capacity antenna. However, insufficient compensation of losses between the communication device and antenna imposes constrains on the application possibility for such a device.

There is an amplifier described in USSR inventor certificate #291310, H03F3/68, "Device of Electric Signal Amplifier" 1971, that is applied to wired communication lines as the signals transmitted via two-wire line in both directions at common frequency band are amplified. The device contains two differently directed switchable amplifiers turned on in parallel. The control inputs of differently directed switchable amplifiers are connected to a generator of rectangular pulses that follow at the rate twice the width of transmit signal spectrum and the outputs of amplifiers are loaded on smoothing low-pass filters. This device enables the implementation of duplex communication in a common frequency band. However, the use of such a device is limited by the frequency range because in the UHF range switching frequency should be above signal spectrum carrier frequency.

There is a cell enhancer for a cellular communications system disclosed in U.S. Pat. No. 4,704,733 "Cell enhancer for cellular radio telephone system having diversity function", H04B 7/14, Nov. 3, 1987. The cell enhancer includes the spacing function. The device contains the system of a first amplifier for amplification of signals of the forward and reverse channels between a first set of antennas and the system of a second amplifier for amplification of at least signals of the forward channel between the second set of antennas. Antennas have the selected minimum correlation between them to maintain diversity within a cell. This enhancer, however, is not economic because there is no mode control is available to it.

A device is described in U.S. Pat. No. 4,850,034 "Method and apparatus for installing a cellular telephone in a vehicle", H04B 1/40, Jul. 18, 1989. The purpose of this device is to connect antenna to a communication device. For this purpose a low pass filter (LPF) is introduced between an existing receiver and communication device; and HPF is introduced between a mobile phone and a communication device. An antenna operates as a monopolar antenna with double wavelength for a mobile phone transmitter with higher frequency. Connection of the existing antenna and receiver can be interrupted, for which an adaptor device is designed. However, this device does not compensate for losses in case of long wavelength of coaxial cable.

Figure 1:
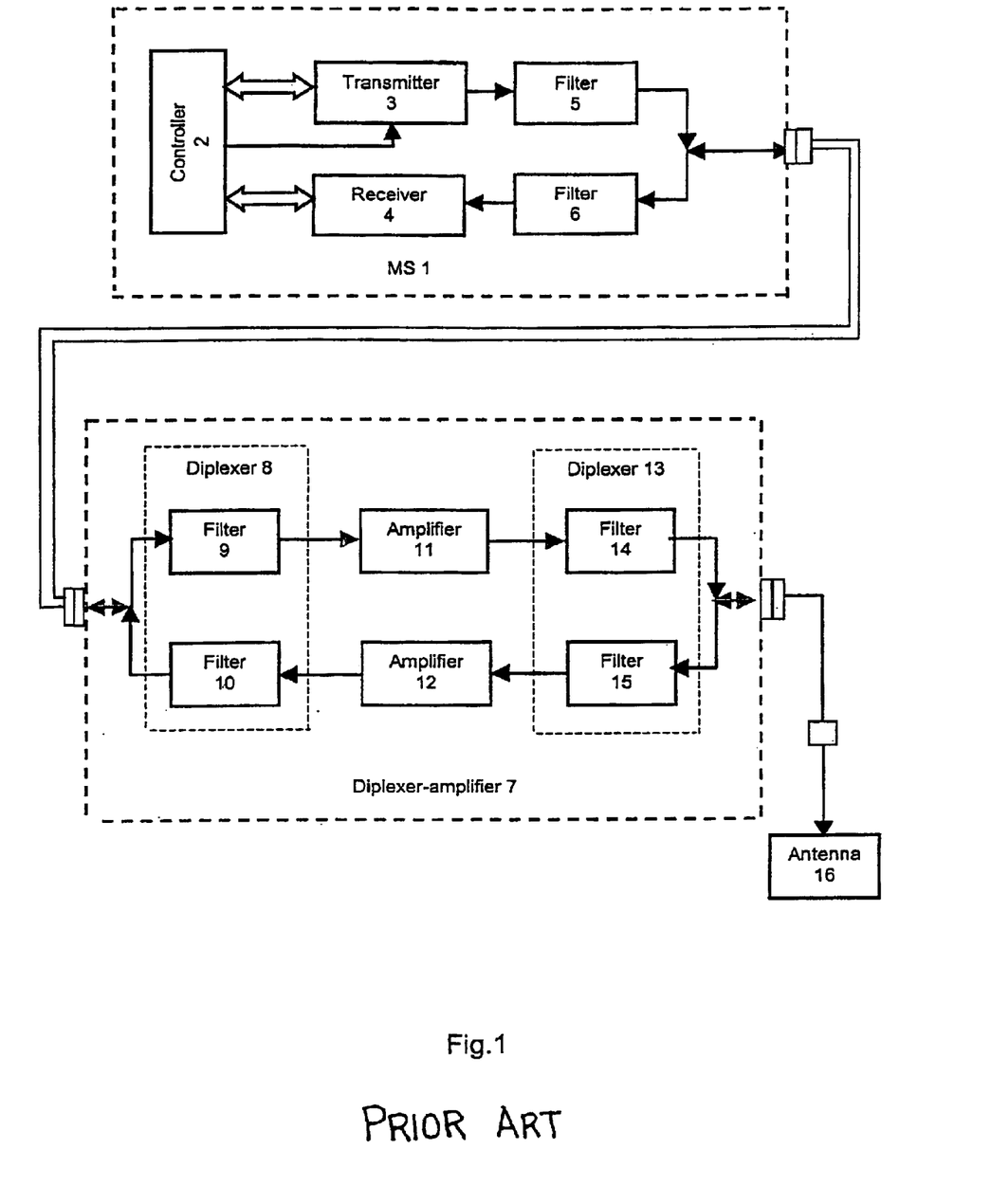
FIG. 1 is a block diagram of the prototype device.

The closest to the present invention is a device described in U.S. Pat. No. 5,502,715 "Integrated diplexer-amplifier for near antenna installation", H04B 3/36, H04L 5/14, Mar. 26, 1996. The block diagram of the prototype device is shown in FIG. 1.

This device is a subscriber set comprising mobile station 1, diplexer-amplifier 7 and antenna 16. Standard MS 1 (frequency isolation unit) includes controller 2, whose inputs/outputs are connected to transmitter 3 and receiver 4. The control output of controller 2 is connected to the input of transmitter control 3. The output of transmitter 3 via first filter 5 is joined with the output/input of MS 1. The input/output of MS 1 via second filter 6 is linked to the input of receiver. MS 1 via connectors and coaxial cable is connected to diplexer-amplifier 7. Diplexer-amplifier 7 includes first diplexer 8, amplifiers 11 and 12, second diplexer 13. Diplexer 8 (first duplex filter) is composed of filters 9 and 10. Diplexer 13 (second duplex filter) comprises filters 14 and 15. The first input/output of diplexer-amplifier 7 is connected to the input of filter 9 and output of filter 10. The second input/output of diplexer-amplifier 7 is joined with the input of filter 15 and output of filter 14 and via a connector and coaxial cable is linked to antenna 16.

The device operates in the following manner.

In MS 1, transmitter 3 generates a signal radiated at the frequencies of MS transmission. Filter 5 tuned to these frequencies limits radiation band. Receiver 4 and filter 6 are tuned to receive frequency. Processing of receive and transmit signal, control over the operation modes of receiver and transmitter are the function of controller 2. Using filters 5 and 6, MS 1 allows two desired transmit and receive signals, separated by frequency and power level, to pass to diplexer-amplifier 7. The output signal of transmitter 3 filtered by filter 5 via the coaxial connector and communication line is supplied to the input of filter 9 of diplexer 8 that is a part of diplexer-amplifier 7. Having passed filter 9, a signal is amplified by power amplifier 11 and is then filtered by filter 14 that is a part of diplexer 13. This signal is transmitted via the coaxial connector and coaxial cable to antenna 16.

The received signal via antenna 16 and the coaxial cable is supplied to the coaxial connector and to the input of filter 15 of diplexer 13. A signal from the output of filter 15 is amplified by power amplifier 12 and is sent to filter 10 of diplexer 8. The output signal of filter 10 via coaxial connectors and communication line is sent to MS 1 to filter 6 and receiver 4.

Amplifier 12 has low noise figure and sufficient gain factor so as to compensate the coaxial cable losses during signal reception/transmission. Due to the fact that power amplifier 11 is permanently on and its power consumption considerably exceeds the power consumed by MS in passive mode, economy of the user set, which includes MS, antenna amplifier and antenna, is substantially degraded.

SUMMARY OF INVENTION

The goal of the present invention is to improve system power consumption economy, transmitter/receiver signal attenuation in cable being fully compensated.

To meet this goal, two variants of duplex antenna amplifier mobile stations are proposed.

The invention objective is achieved through the following. Antenna diplexer amplifier MS of the first variant, comprising MS and duplex antenna amplifier both linked by a communication line, and antenna connected with duplex antenna amplifier, wherein MS includes a controller, which by its inputs/outputs is joined with output/inputs of transmitter and receiver; the control output of the controller is connected to the input of transmitter control; the output of transmitter is linked to the input of a first filter, whose output is joined with the output/input of MS; the input/output of MS is coupled on to the input of a second filter, whose output is joined with the input of a receiver; the duplex antenna amplifier comprises successively linked a first diplexer, composed of third and fourth filters, first amplifier, second diplexer, composed of fifth and sixth filters, second amplifier, whose output is connected to the input of the first diplexer; the output/input of the second diplexer is connected to second input/output of the duplex antenna amplifier, the input/output of the first diplexer is linked to the first input/output of the duplex antenna amplifier, additionally, according to the present invention:

In MS: successively linked a first controllable power source and a LPF; the input of the first controllable power source is combined with the control input of a transmitter and linked to the control output the controller, the output of the first LPF is joined with the output/input of MS, In duplex antenna amplifier: successively linked a second LPF and a second controllable power source, successively connected to a third LPF and a stabilizer, wherein the first input/output of the duplex antenna amplifier is joined with the inputs of the second and third LPFs; the output of the second controllable power source is connected to the second input of the first amplifier, the output of stabilizer is coupled on to the second input of the second amplifier.

The invention objective is further achieved through the following. The duplex antenna amplifier MS of the second variant comprising MS and a duplex antenna amplifier both linked by a communication line, and an antenna connected to the duplex antenna amplifier, wherein MS contains a controller, whose inputs/outputs are joined with the outputs/inputs of a transmitter and receiver; the control output of the controller is coupled on to the control input of the transmitter; the output of the transmitter is linked to the input of a first filter, whose output is connected to the output/input of MS; the input/output of MS is joined with the input of a second filter, whose output is linked to the input of the receiver; the duplex antenna amplifier comprises successively linked a first amplifier, diplexer, second amplifier, wherein the output/input of the diplexer is connected to the second input/output of the duplex antenna amplifier, additionally, according to the present invention:

In MS: successively linked a first controllable power source and a first LPF; the input of a first controllable power source is combined with the control input of a transmitter and is joined with the control output of a controller; the output of the first LPF is linked to the output/input of MS, In duplex antenna amplifier: a splitter, rejector, successively connected a second LPF and a second controllable power source, successively linked a third LPF and stabilizer; the first input/output of the splitter is connected to the first output/input of the duplex antenna amplifier; the second input/output of the splitter is joined with the first output/input of the rejector; the second input of the rejector and input of third LPF are combined and linked to the output of a second amplifier, the second input of which is coupled to the output of the stabilizer, the third output of the splitter is linked to the first input of the first amplifier and to the input of the second LPF, the second input of the first amplifier is connected to the output of the second controllable power source.

Introduction of new features into MS, according to the first and second variants of the device, makes it more economic compared to the prototype because in the mode of stand-by reception and in the passive mode, large power consumption devices (transmit end) are de-energized, so MS having autonomous power supply the battery life increases.

Introduction of the splitter instead of an expensive diplexer in the second variant enables reduces the cost of MS production.

No less important an advantage of the proposed invention is reduction of the environmental burden on user due to the decreased level of MS radiation.

BRIEF DESCRIPTION OF DRAWINGS

The features, objects, and advantages of the present invention will become more apparent from the detailed description set forth below when taken in conjunction with the drawings in which like reference characters correspond throughout and wherein.

DETAILED DESCRIPTION OF INVENTION

Figure 2:
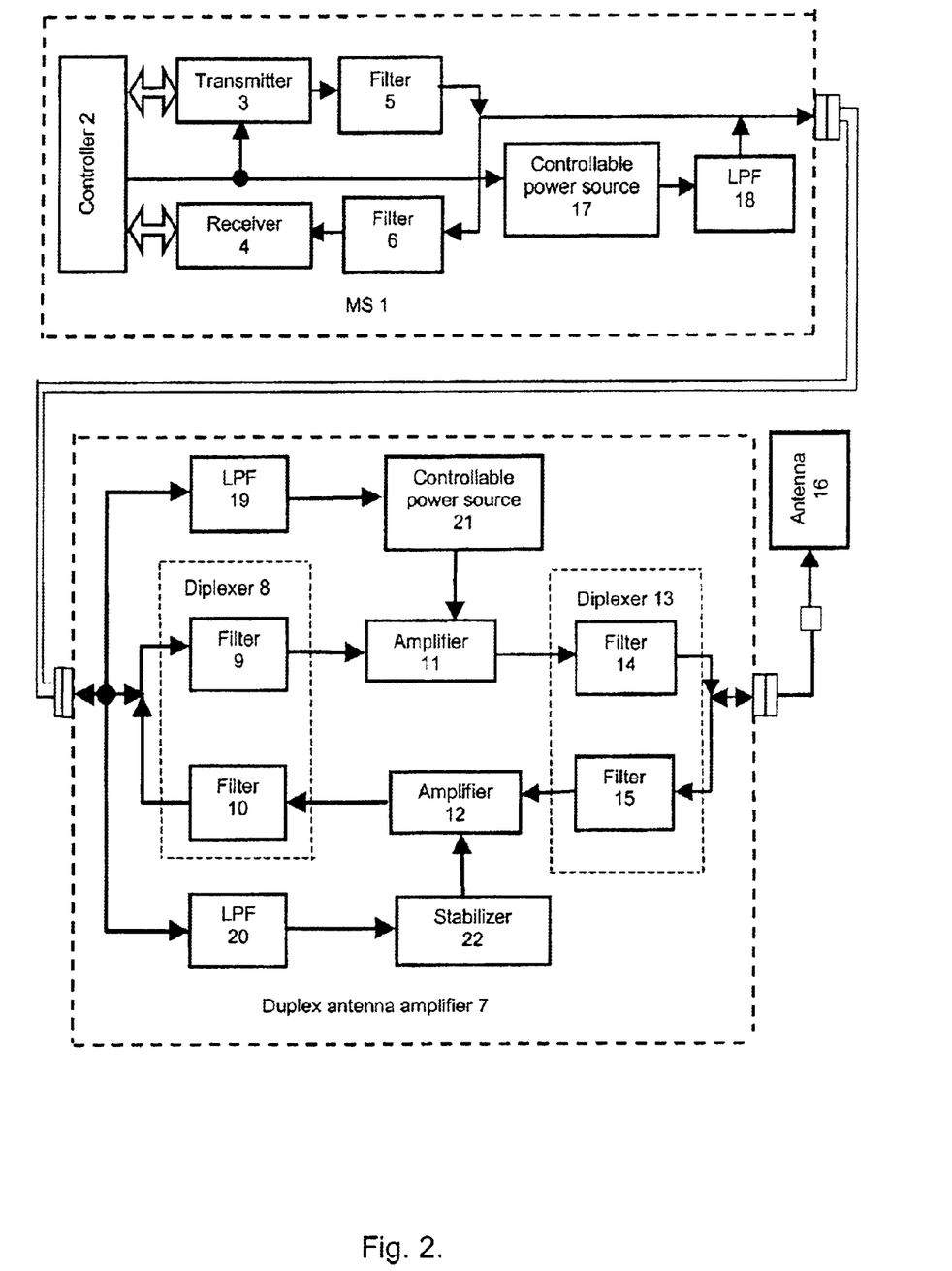
FIG. 2 is a block diagram of the proposed device of the first variant.

The block diagram of the proposed device of the first variant is shown in FIG. 2.

The subscriber set is composed of MS 1 and duplex antenna amplifier 7 both linked by a communication line, and antenna 16 linked to duplex antenna amplifier 7.

According to the present invention, MS 1 comprises controller 2, the inputs/outputs of which are connected to the outputs/inputs of transmitter 3 and receiver 4. The output of transmitter 3 via first filter 5 is connected to the output/input of MS 1. The input of receiver 4 via second filter 6 is linked to the input/output of MS 1. The control output of controller 2 is joined with the control input of transmitter 3. Additionally, controllable power supply 17, the input of which is connected to the control output of controller 2, is introduced into MS 1. The output of controllable power supply 17 via first LPF 18 is connected to the output/input of MS 1.

Duplex antenna amplifier 7, according to the present invention, comprises first diplexer 8 and second diplexer 13. First diplexer 8 includes filter 9 tuned to the transmission frequency and filter 10 tuned to the reception frequency.

Second diplexer 13 comprises filter 14 tuned to the transmission frequency and filer 15 tuned to the reception frequency. The first input/output of duplex antenna amplifier 7 is connected to the input of filter 9 and output of filter 10. The output of filter 9 via first amplifier 11 is joined with the first input of diplexer 13 (the input of filter 14). The first output of diplexer 13 (the output of filter 15) via second amplifier 12 is connected to the input of filter 10. The second input/output of diplexer 13 is linked to the second input/output of duplex antenna amplifier 7.

Additionally second and third LPFs 19 and 20, respectively, controllable power source 21, stabilizer 22 are introduced into duplex antenna amplifier. The first input/output of duplex antenna amplifier 7 via second LPF 19 is joined with the input of second controllable power source 21 and via third LPF 20—with the input of stabilizer 22. The output of controllable power source 21 is connected to the second input of first amplifier 11. The output of stabilizer 22 is linked to the second input of second amplifier 12.

The disclosed device operates in the following manner.

Figure 4:
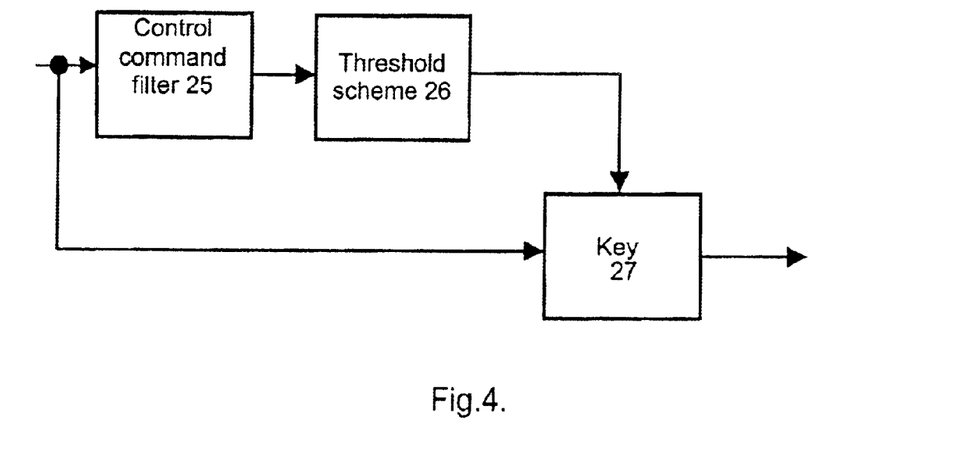
FIG. 4 is an exemplary embodiment of the controllable power source.

In MS 1 transmitter 3 generates a signal radiated at the frequencies of MS. Filter 5 tuned to these frequencies limits the radiation band. Receiver 4 and filter 6 are tuned to the reception frequency. Processing of the receive and transmit signals, control of receiver/transmitter operation modes constitute the function of controller 2. In the block diagram, transmitter on/off control circuit 3 is shown separately. In the proposed device, this circuit apart from transmitter control 3 includes controllable power supply 17 (control command converter). An exemplary embodiment of controllable power supply 17 is shown in FIG. 4. Controllable power supply 17 comprises successively connected control command filter 25, threshold scheme 26, and key 27. The input of control command filter 25 is combined with the second input of key 27 and is the input of controllable power source 17; the output of key 27 is the output of controllable power source 17. Controllable power source 17 consists of two main branches: a control command selector and a controllable unit. From the input, the command signal is passed via filter 25 matched to its command parameters. After that the generated control signal is supplied to threshold scheme 26 that determines the presence or absence of the command enabling transmitter 3 at a given moment. Then the signal manipulates power supply key 27.

Next, the control command is combined with the receive/transmit signal in the general circuit at the output of MS 1. Filter 18 serves to separate a receive/transmit UHF signal from a lower frequency (up to direct voltage) signal, a command signal. Having passed the communication cable, these signals are supplied to the first input/output of duplex antenna amplifier 7 (frequency isolator).

Filter 19 has high attenuation for the primary signal (up to 30–40 dB) and low for the control command and voltage supply. The control command, having passed filter 19, enables control of power source 21 from which power is supplied to power amplifier 1. Controllable power source 21 is similar to power source 17. Power amplifier 11 amplification is selected so as to compensate the attenuation of the transmitter signal traveling from the output of frequency splitter (MS) 1 to antenna 16.

MS 1 transmitter signal, having passed tuned to its frequency filter 9 of diplexer 8, is then intensified by amplifier 11 and via filter 14 of diplexer 13 also tuned to transmitter frequency is applied to the output of diplex antenna amplifier 7 and then to antenna 16.

The signal received by antenna 16 intended for receiver 4 of MS 1 is admitted by tuned to its frequency filter 15 of diplexer 13, amplified in amplifier 12 and via filter 10 of diplexer 8 is sent to the output of unit 7 and after that via the communication cable and filter 6 is applied to the input of receiver 4. Amplifier 12 is powered from stabilizer 22 intended to provide the direct current mode for amplifier 12 with various cable lengths and operation modes. Supply voltage from MS 1, via the communication cable is applied to stabilizer 22 via filter 20 that isolates supply circuit from RF receive and transmit signals. Stability of duplex antenna amplifier 7 operation like in the prototype is provided for the loop of filter 9—amplifier 11—filter 14—filter 15—amplifier 12 filter 10—filter 9 using diplexers 8 and 13 with the attenuation in this direction of 50–55 dB for any frequency. The presence of two amplifiers 11 and 12 in the loop with the combined gain of 60 dB normalizes the requirements to radio frequency isolation in filters 19 and 20. To keep operation stability of duplex antenna amplifier 7 (to prevent from it turning into generator), attenuation in these filters at the receive/transmit frequencies should be no less than 30–40 dB, which is easily accomplished.

Applying the proposed device to MS makes the latter more economic compared to the prototype because autonomous power supply of MS is used. The main consumer in unit 7 is power amplifier 11. For example, given the output power of +(15–17) dBm, current consumption of this amplifier is about 200 mA, while current consumption of the whole unit is about 216 mA (there is a scheme using chips HP MGA-83563 in amplifier 11 and MGA-86563 in amplifier 12). With receive/transmit time ratio of 3/1, a contribution of the introduced control to total power reduction will be: 4*216/(4*16+216)=3.08. In other words, the life of batteries will be increased by this value. As receive/transmit time ratio increases, power consumption gain and continuous operation time increase.

The cost of diplexers 8 and 13 makes a considerable part of the entire duplex antenna amplifier 7 cost. Unit 7 can be made much cheaper if a splitter is substituted for diplexer 8, the inputs of filter 19 and 20 are connected to the inputs of amplifiers 11 and 12, respectively, and a rejector tuned to the transmitter frequency is connected between the bottom output of the splitter and the input of amplifier 12.

Figure 3:
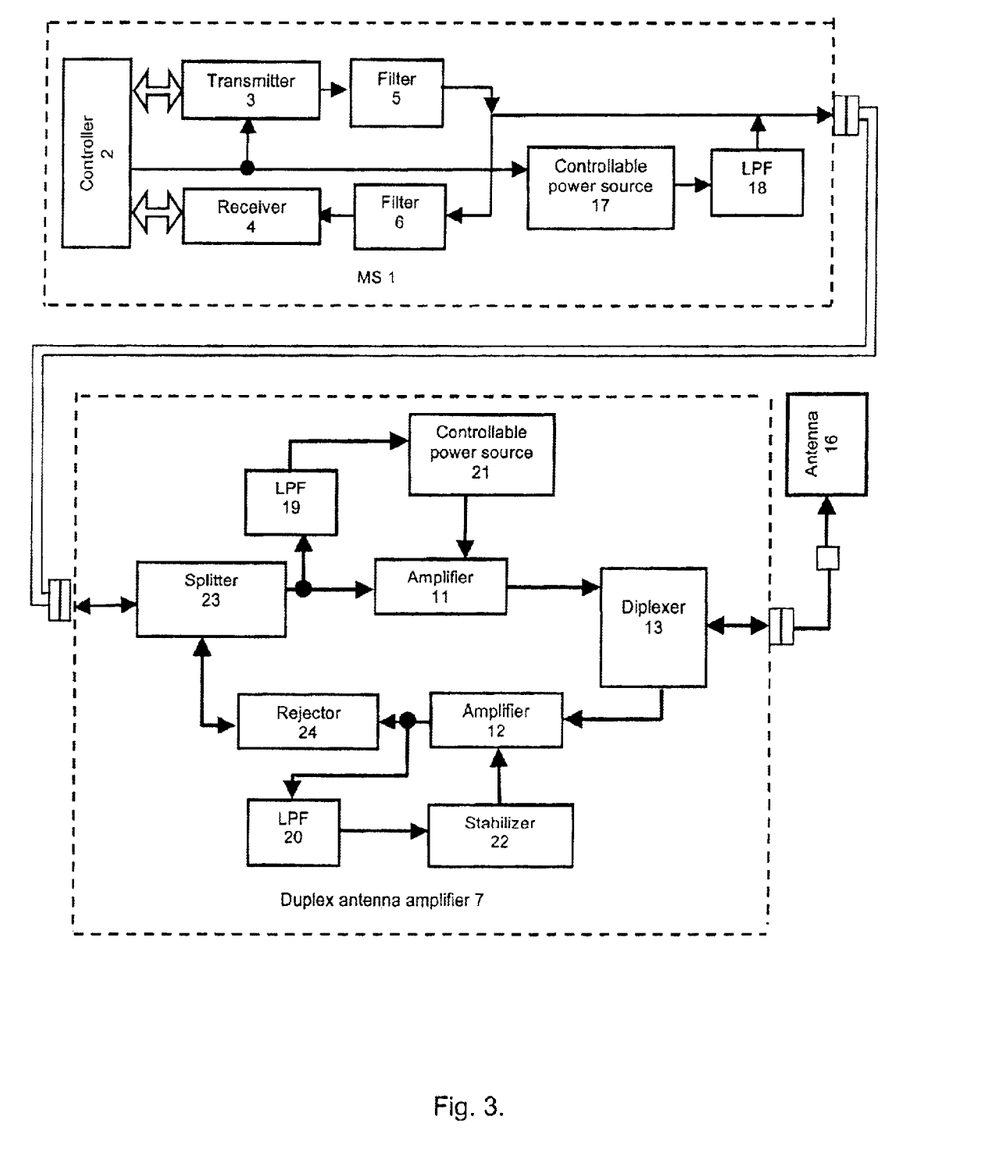
FIG. 3 is a block diagram of the proposed device of the second variant.

Considering the above assumption, the block diagram of the second variant of the proposed device will be as shown in FIG. 3.

The user set comprises MS 1 and duplex antenna amplifier 7 both linked by the communication line, antenna 16 connected to duplex antenna amplifier 7.

According to the present invention, MS 1 comprises controller 2, the inputs/outputs of which are connected to the outputs/inputs of transmitter 3 and receiver 4. The output of transmitter 3 via first filter 5 is joined with the output/input of MS 1. The input of receiver 4 via second filter 6 is coupled to the input/output of MS 1. The control output of controller 2 is linked to the control input of transmitter 3. Additionally controllable power source 17, the input of which is joined with the control output of controller 2, is introduced into MS 1. The output of controllable power source 17 via first LPF 18 is coupled to the output/input of MS 1.

According to the present invention, duplex antenna amplifier 9 comprises successively connected first amplifier 11, diplexer 13, second amplifier 12, wherein the output/input of diplexer 13 is linked to the second input/output of duplex antenna amplifier 7. Additionally splitter 23, rejector 24, successively linked second LPF 19 and second controllable power source 21, successively linked third LPF 20 and stabilizer 22 are introduced into duplex antenna amplifier 7.

The first input/output of splitter 23 is joined with the first output/input of duplex antenna amplifier 7; the second input/output of splitter 23 is connected to the first output/input of rejector 24. The second input of rejector 24 and the input of third LPF 20 are combined and coupled to the output of second amplifier 12 whose second input is linked to the output of stabilizer 22. The third output of splitter 22 is connected to the first input of first amplifier 11 and the input of second LPF 19; the second input of first amplifier 11 is linked to the output of second controllable power source 21.

MS 1 operates in the same manner as in the first variant of the device.

Now let us consider the traveling of the transmitter signal and control command mixture.

Having passed through the communication cable, these signals are applied to the first input/output of duplex antenna amplifier 7. Splitter 23 of duplex antenna amplifier 7 equally separates the signals and supplies them to:

rejecter 24. The rejection frequencies of this filter are selected so as to cancel the signal of transmitter 3. So for further consideration, it is possible to assume that the signal of transmitter 3 is not available at the input of filter 24.

filter 19, similar to filter 18 of unit 1. Filter 19 fully admits the control command signal and considerably attenuates the signal of transmitter 3 whose level at the output of filter 19 is neglected.

to controllable power amplifier 11 whose gain is calculated so as to compensate signal attenuation at the frequency of transmitter 3 in the communication cable between units 1 and 7.

Amplifier 11 is enabled from controllable power source 21 (control command converter) as the command enabling transmitter 3 is supplied from controller 2 via controllable power source 17, LPF 18, splitter 23, LPF 19.

The signal of transmitter 3 intensified to the initial level passes through the upper branch of duplexer 13 tuned to the transmission frequencies and is radiated by antenna 16 with the power equal to the power of MS 1 (according to the calculation of full compensation of attenuation in the communication cable due to amplification in unit 11).

Let us consider traveling of the signal received by antenna 16 at the reception frequency.

The second branch of duplexer 13 is tuned to the reception frequencies, so the signals of transmitter 3 pass through this branch significantly attenuated. The signals at the reception frequency, having passed the bottom branch of diplexer 13 are sent to the input of amplifier 12. Amplifier 12 is powered from stabilizer 22 that is powered from the communication cable to MS 1 via splitter 23, rejector 24 and filter 20. The latter is similar to filter 19 and serves to separate an UHF signal from lower frequency (including DC) signals of control and supply. Stabilizer 22 provides normal operation of amplifier 12, independently of control commands with supply voltage fluctuations in the cable, to MS 1 in case duplex antenna amplifier 7 operation modes change.

Amplification gain in amplifier 12 is selected taking account of full compensation of losses from antenna 16 to the input of MS 1. The noise parameters are similar to the parameters of MS 1 receiver. Rejector 24 lets receive frequencies through practically non-attenuated, so the receive signal received by antenna 16 and amplified is via splitter 23 supplied to the communication cable and then on to the MS receiver.

The necessary condition for application of the duplex antenna amplifier is operation stability. The structure of unit 7 includes the loop splitter 23—amplifier 11—diplexer 13—amplifier 12—rejector 24 splitter 23. The gain in this loop for any frequency should be substantially less than 1 so that to avoid the loop turning into a "generator".

For the transmission frequencies, given isolation in the splitter based, for example, on the Wilkinson scheme, of approximately 25–30 dB (see Power Splitters <<Mini-Circuits®>>), intensification in unit 11 of as great as 30 dB, attenuation in duplexer 13 (considering the bottom branch) of 50–55 dB [SEMCO duplexer DFX3475J3575W., Murata Catalog of DFY2R836CR881BHA., FUJITSU SEMICONDUCTOR D5CB Series (D1).], amplifier 12 usually fails to separate the transmission or receptions frequencies. Amplification of it is approximately the same as that of amplifier 11 and can reach 30 dB.

The necessity in using rejector 24 at the output of amplifier 12 is due to the following. Usually an economic low noise amplifier that has low linearity due to low current consumption is used as such an amplifier. The presence of the transmitter signal of relatively high level at its output can result in intermodulation distortions in amplifier 12. Rejector 24 attenuates the transmitter signal by 10–15 dB that is equal to reduction of intermodulation by 20–30 dB. As a result, the effect of the latter is practically unavailable.

FIG. 4 is the dependence of the rejector parameters on frequency. S21 and S12 are the rejector gains, S11 and S22 are the rejector reflection factors.

Hence, the loop gain for the transmission frequencies is about minus (25–40) dB, i.e. the loop is stable in this direction.

For the reception frequencies, like amplifier 12, amplifier 11 is not selective: its amplification for the reception and transmission frequencies is practically the same; diplexer 13 is normally symmetrical too; the only difference would be low attenuation (practically 0 dB) of rejector 24 for the reception frequencies.

Consequently, the loop gain for the reception frequencies is approximately minus (15–25) dB, i.e. the loop is stable in this direction too.

Hence, operation stability retained, duplex power amplifier 7 fully compensates the attenuation of the transmitter and receiver signal in the communication cable.

Applying the proposed invention to MS is to make it more economic compared to the prototype because, the battery life among MS parameters, one of the variants of this invention employs autonomous power supply of MS. The main consumer in unit 7 is power amplifier 11. For example, given the output power of +(15–17) dBm, current consumption of this amplifier is about 200 mA, while the total consumption of the unit is approximately 216 mA (there is a specific scheme using HP MGA-83563 chips in amplifier 11 and MGA-86563 in amplifier 12). Given receive/transmit time ratio of 3/1, the contribution of the introduced control to total power reduction will be: 4*216/(4*16+216)=3.08. In other words, the battery life is multiplied by this value. As the receive/transmit time ratio increases, the power consumption gain and battery life increases even more.

No less important a point is that owing to the decreased MS radiation level the environmental burden on a user becomes reduced.

A substantial difference from the prototype is the use of splitter 23 and rejector 24 instead of the diplexer similar to filter 13.

Figure 5:
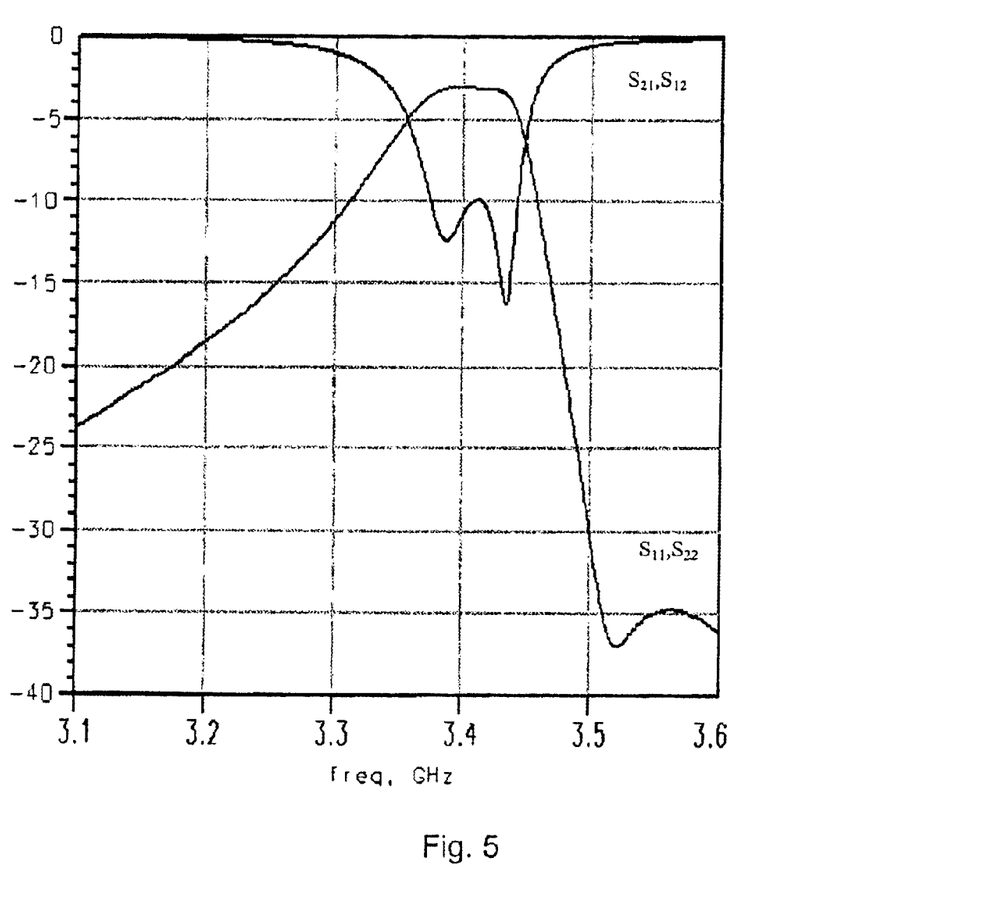
FIG. 5 is a dependence of the parameters of the rejector on frequency.
Figure 6:
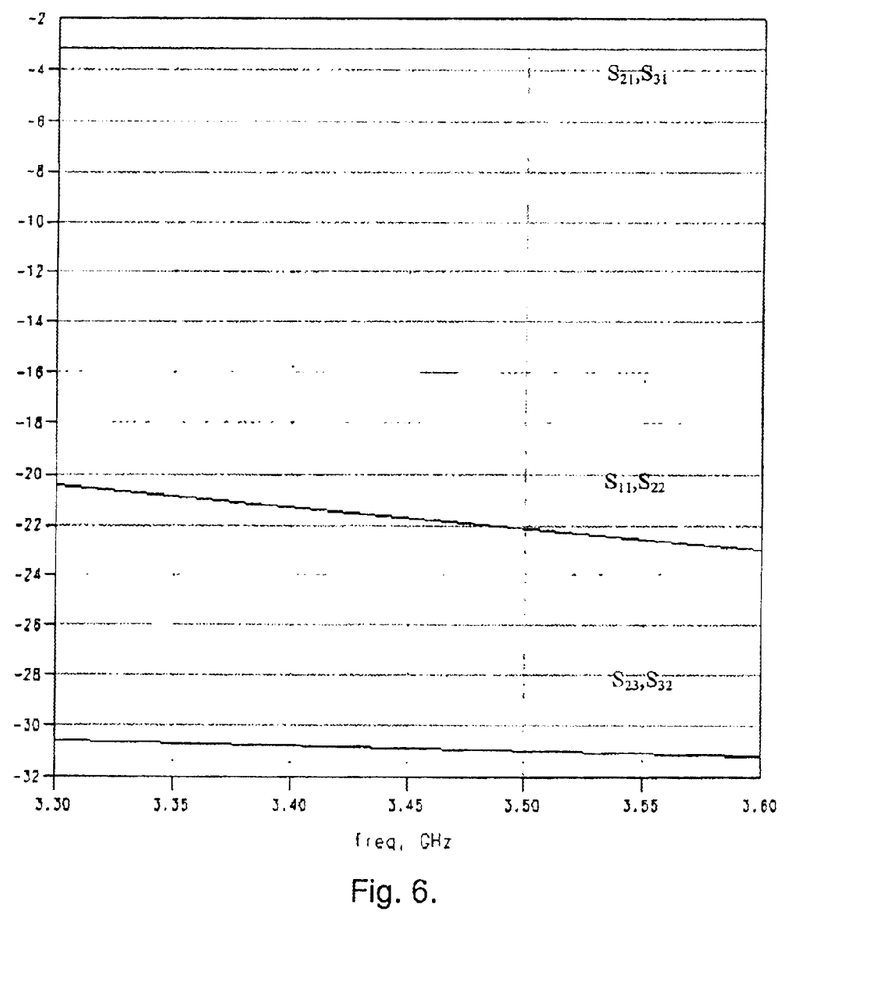
FIG. 6 is a dependence of the splitter on frequency.

FIG. 5 is the dependence of the splitter parameters on frequency, wherein $S_{21}$ and $S_{31}$ characterize the gains from the input to the outputs of the splitter. Splitting is seen to be symmetric practically without losses. $S_{23}$ characterizes the isolation between the outputs of the splitter that is over 30 dB in this frequency range.

The parameters $S_{11}$ $S_{22}$ determine input and output standing wave ratio (SWR). SWR is seen to be no worse than 1,2. For low frequencies the splitter does not have losses.

The operation modes of amplifier 11 are controlled by the communication cable to MS 1. For that current supply and control command must have unimpeded way to the input of amplifier 11. The diplexer is not intended for this, so in case it is used like in the prototype, power supply and control command should be removed before the filter, from the general point at the input of unit 7. In that case the isolation provided by the diplexer would have been shunted by communication at UHF via filter 19 and controllable power source 21 plus connection via filter 20 and stabilizer 22. The total isolation via these devices, especially as operation frequencies increase, does not exceed 40–50 dB and is connected with further design complication, increased technological complexity and implementation cost. The diplexer isolation of 55 dB shunted by the described 50 dB connections provides the total isolation of about 46 dB. This connection can shunt and neutralize the isolation performance of both the diplexer and the entire scheme looses reliability. In addition, applying two diplexers instead of one considerably increases the frequency isolator cost.

INDUSTRIAL APPLICABILITY

The mobile station with duplex antenna amplifier is designed to control the power supplied to antennas and compensate for the attenuation of radio signals in communication cables. The mobile station is environmentally sounder, provides more safety to a user situated in the vicinity of powerful transmitters of radio communications systems, for example, mobile/cellular ones. The structure of the proposed mobile station can be implemented based on known devices used in radio

What is claimed is:

1. A mobile device with duplex antenna amplification comprising a mobile station (1), a duplex antenna amplifier (7) both linked by a communication line and an antenna (16) connected to the duplex antenna amplifier (7), wherein the mobile station (1) comprises a controller (2) whose inputs/outputs are joined with the outputs/inputs of a transmitter (3) and receiver (4); the control output of the controller (2) is linked to the control input of a transmitter (3); the output of the transmitter (3) is connected to the input of a first filter (5) whose output is coupled to the output/input of the mobile station (1), the input/output of the mobile station (1) is connected to the input of a second filter (6) whose output is linked to the input of the receiver (4); the duplex antenna amplifier (7) comprises successively linked a first diplexer (8), composed of third and fourth filters (9, 10), a first amplifier (11), a second diplexer (13), composed of fifth and sixth filters (14, 15), a second amplifier (12), the output of which is connected to the input of the first diplexer (8); the output/input of the second diplexer (13) is linked to the second input/output of the duplex antenna amplifier (7); the input/output of the first diplexer (8) is connected to the first input/output of the duplex antenna amplifier (7), characterizing in that the mobile station (1) is added with successively linked a first controllable power source (17) and a first low pass filter (18) (LPF); the input of the first controllable power source (17) is combined with the input of the transmitter (3) control and linked to the control output of the controller (2); the output of the first LPF (18) is joined with the output/input of the mobile station (1); the duplex antenna amplifier (7) is added with successively linked a second LPF (19) and second controllable power source (21), successively linked a third LPF (20) and stabilizer (22); the first input/output of the duplex antenna amplifier (7) is connected to the inputs of the second and third LPFs (19, 20); the output of the second controllable power source (21) is combined with the second input of the first amplifier (11); the output of the stabilizer (22) is joined with the second input of the second amplifier (12).

2. A mobile device with duplex antenna amplification comprising a mobile station (1), a duplex antenna amplifier (7) both linked by a communication line and an antenna (16) connected to the duplex antenna amplifier (7), wherein the mobile station (1) comprises a controller (2) whose inputs/outputs are joined with the outputs/inputs of a transmitter (3) and receiver (4); the control output of the controller (2) is linked to the control input of a transmitter (3); the output of the transmitter (3) is connected to the input of a first filter (5) whose output is coupled to the output/input of the mobile station (1), the input/output of the mobile station (1) is connected to the input of a second filter (6) whose output is linked to the input of the receiver (4); the duplex antenna amplifier (7) comprises successively linked a first amplifier (11), a diplexer (13), a second amplifier (12); the output/input of the diplexer (13) is linked to the second input/output of the duplex antenna amplifier (7); characterizing in that mobile station (1) is added with successively linked a first controllable power source (17) and the first low pass filter (18) (LPF); the input of the first controllable power source (17) is combined with the input of the transmitter (3) control and linked to the control output of the controller (2); the output of the first LPF (18) is joined with the output/input of the mobile station (1); the duplex antenna amplifier (7) is added with a splitter (23), rejector (24), successively linked a second LPF (19) and a second controllable power source (21), successively linked a third LPF (20) and a stabilizer (22); the first input/output of the splitter (23) is joined with the first output/input of the duplex antenna amplifier (7), the second input/output of the splitter (23) is connected to the first output/input of the rejector (24), the second input of the rejector (24) and the input of the third LPF (20) are combined and connected to the output of the second amplifier (12) whose second input is joined with the output of the stabilizer (22), the third output of the splitter (23) is linked to the first input of first amplifier (11) and to the input of second LPF (19); the second input of the first amplifier (11) is connected to the output of the second controllable power source (21).

* * * * *